A. R. MITCHELL.
APPARATUS FOR TRANSMITTING AND DISPLAYING SIGNALS AND THE LIKE.
APPLICATION FILED MAR. 23, 1915.
1,264,204.
Patented Apr. 30, 1918.
4 SHEETS—SHEET 1.
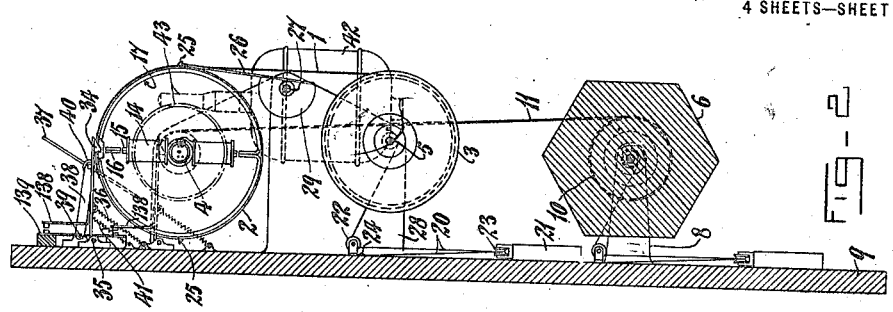

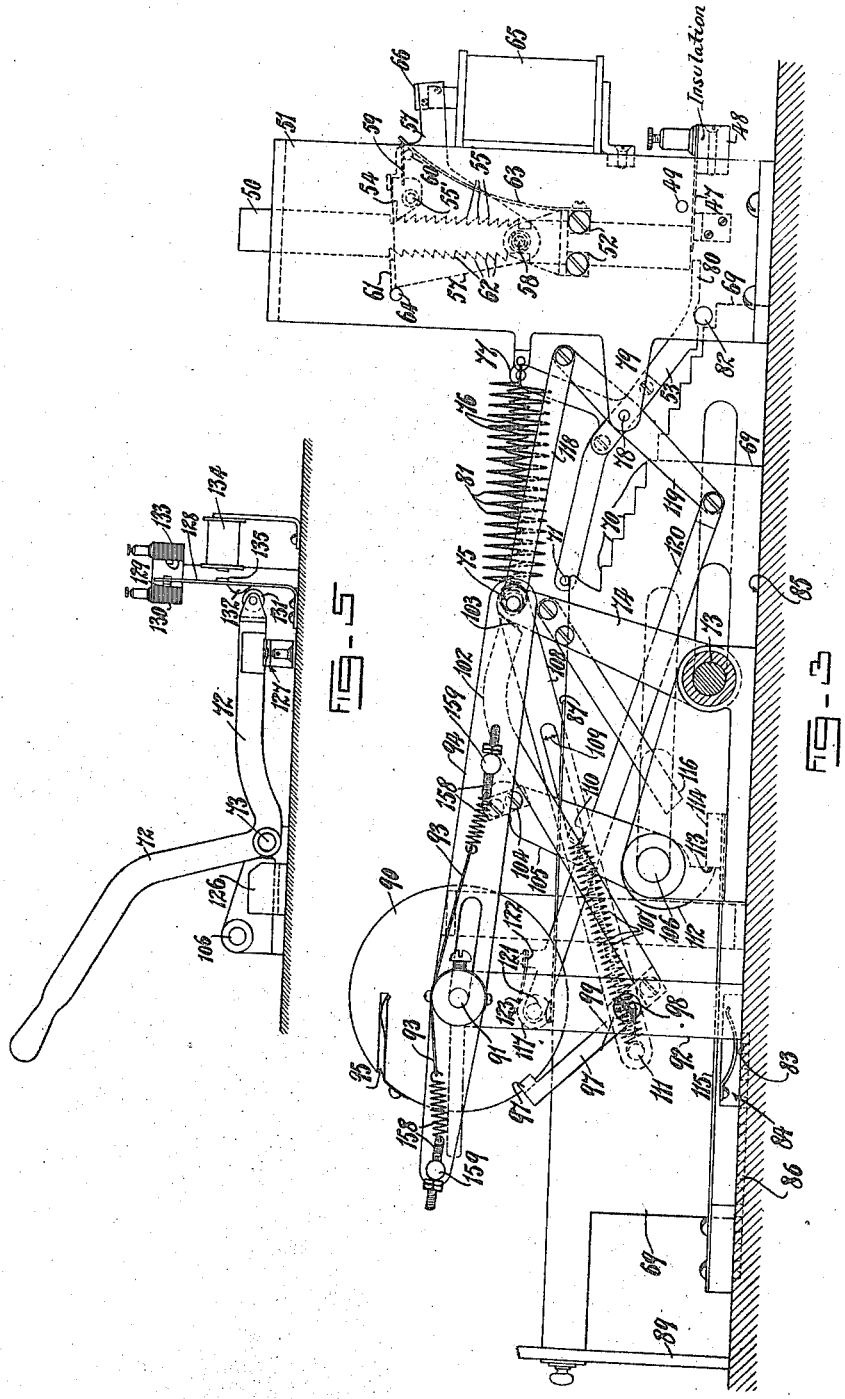

A. R. MITCHELL.
APPARATUS FOR TRANSMITTING AND DISPLAYING SIGNALS AND THE LIKE.
APPLICATION FILED MAR. 23, 1915.
1,264,204.
Patented Apr. 30, 1918.
4 SHEETS—SHEET 3.
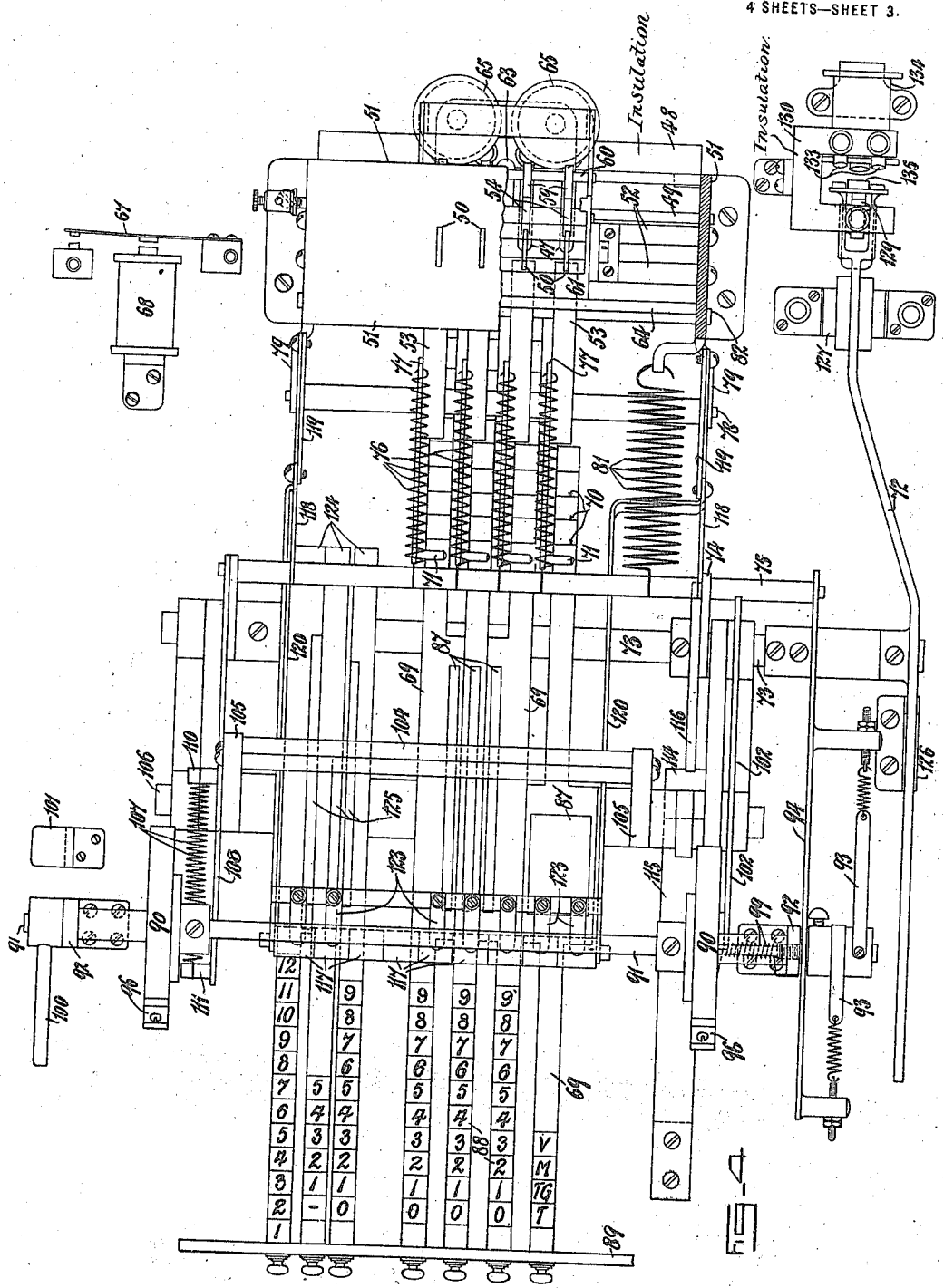

A. R. MITCHELL.
APPARATUS FOR TRANSMITTING AND DISPLAYING SIGNALS AND THE LIKE.
APPLICATION FILED MAR. 23, 1915.
1,264,204.
Patented Apr. 30, 1918.
4 SHEETS—SHEET 4.
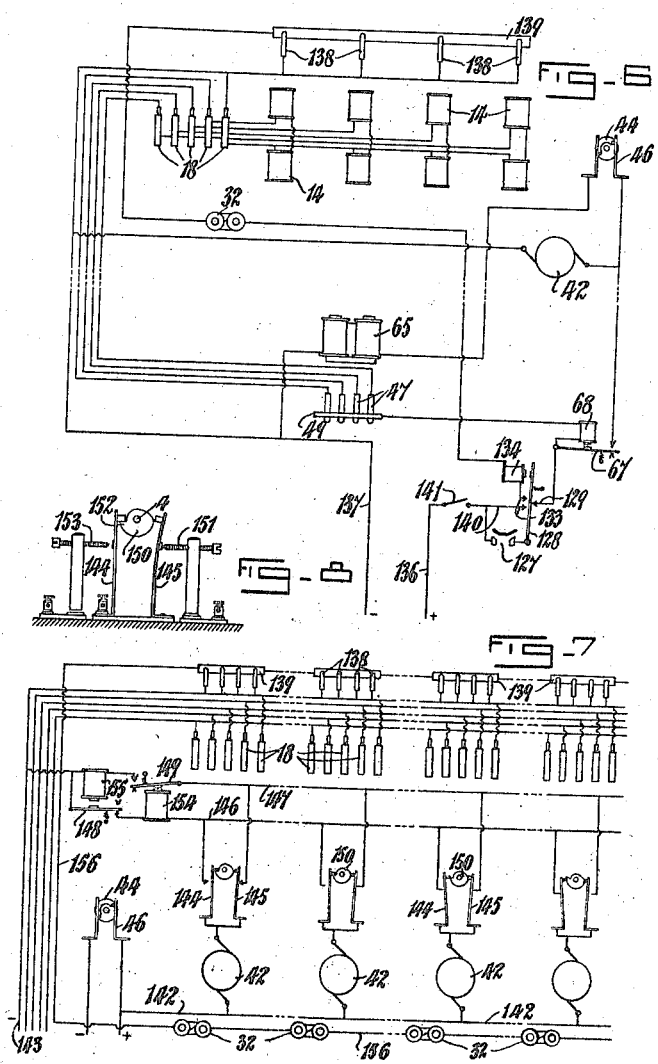

UNITED STATES PATENT OFFICE.

ARCHIBALD ROBERTSON MITCHELL, OF LONDON, ENGLAND.

APPARATUS FOR TRANSMITTING AND DISPLAYING SIGNALS AND THE LIKE.

1,264,204. Specification of Letters Patent. Patented Apr. 30, 1918.

Application filed March 23, 1915. Serial No. 16,478.

*To all whom it may concern:*

Be it known that I, ARCHIBALD ROBERTSON MITCHELL, a subject of the King of Great Britain, and resident of London, England, have invented certain new and useful Improvements in Apparatus for Transmitting and Displaying Signals and the like, of which the following is a specification.

This invention relates to an improved apparatus for transmitting and displaying signals and the like. It has reference to devices adapted for displaying announcements in hotels or like places of public resort.

Apparatus constructed in accordance with this invention, broadly comprises some form of indicator and a transmitting device adapted to control the said indicator from a distant point and to cause it to exhibit the required notice or announcements.

The means whereby this transmitting device operates to set up the announcement on the indicator and the means whereby the operation of the said indicator re-acts upon the transmitting device to restore its parts to their normal positions constitute important features of my invention.

A further important feature is comprised in the means adopted for insuring the return of the indicator parts to their normal positions before the transmitter can operate to set up another announcement and a still further feature consists in the hereinafter described synchronizing arrangement whereby it is possible to operate a number of indicators from a single transmitter without one indicator impairing the action of the others by reason of a difference in speed. I also preferably incorporate with the transmitter some form of printing device whereby a permanent record of all announcements may be obtained.

In order that the nature of my invention may be more readily understood I will now proceed to describe one convenient embodiment thereof, reference being made to the accompanying drawings wherein:

Figure 1 is a front elevational view of my preferred form of indicator, a portion being taken away to show the internal mechanism.

Fig. 2 is a sectional end elevational view, the section being taken mainly on line A—B of Fig. 1.

Fig. 3 is a side elevational view of the transmitting device.

Fig. 4 is a plan view thereof.

Fig. 5 is a side elevational view showing to a reduced scale the operative lever of the transmitter and also certain of the mechanism actuated thereby and not shown in Fig. 3.

Fig. 6 is a diagram showing the electrical connections in and between the indicator and transmitter.

Fig. 7 is a diagram showing the electrical connections necessary when several indicators are simultaneously operated from one transmitter and illustrating the synchronizing device.

Fig. 8 illustrates a detail of the synchronizing device.

Referring to Figs. 1 and 2 of the drawings, the indicator preferably comprises a plurality of flexible bands 1, each band being wound upon a pair of rotatable drums 2 and 3. The ends of each band are respectively connected to each of the drums 2 and 3 on which it is wound and one drum 2 of each pair is loosely mounted upon the main driving shaft 4 of the indicator while the second drum 3 of each pair is loosely mounted upon a suitable common spindle 5, being free to rotate idly thereon. Upon each band is a series of letters, numerals, or other signs, so arranged that, by suitably moving the several bands to various positions, various words, numbers or other desired combinations of signs may be exhibited.

When the indicator is operating to set up a sign or announcement its main shaft 4 is rotating continuously and the several driving drums 2 are each separately clutched up to this revolving shaft for a period sufficient to bring the required sign into view, each drum being automatically declutched when it has brought the required sign into position.

For reasons which will hereinafter be apparent, it is convenient though not essential to so arrange the device that each half-revolution of the drum 2 serves to bring a fresh sign into view and in the following description it will be assumed that this arrangement has been adopted.

In addition to the aforementioned flexible bands 1 the indicator may be provided with a roller 6, bearing appropriate words or signs upon its circumference. This roller 6 is mounted on a spindle 7 journaled in suitable bearings 8 and the back plate 9 of the indicator. It is provided with a pulley 10 which is connected by a driving band 11 to another pulley 12 of suitable relative diameter mounted on a driving drum 13 similar to the drum 2 described in connection with the flexible bands aforesaid.

I preferably employ electromagnetic clutching devices for clutching the driving drums to the main shaft. Within each of the driving drums 12 and 13 and mounted upon the main shaft 4 is an electromagnet 14 having two or more poles 15 adapted to coöperate with corresponding pole pieces 16 upon an annular armature 17 mounted within the drum upon the inner circumference thereof. When the magnet is energized it "picks up" the pole pieces 16 on the annular armature 17 and drives the drum around with the shaft 4 by reason of the strong flux through the magnetic circuit. The main shaft 4 is hollow and through it the electric connections for the electromagnets are carried to a series of slip rings 18 mounted on one end of the said shaft.

Upon each of the idle drums 3 and upon the roller 6 is mounted a pulley 19 and a cord 20 attached to the drum and wound upon each pulley is loaded with a suitable weight 21, the arrangement being such that the weight always tends to keep the indicator band 1 in tension. In the arrangement shown, each cord is passed over a pulley 22 fixed on the back plate 9 and thence around a sheave 23 on the weight 21 to a fixed pin 24 by which it is secured to the back plate. The weights 21 also operate to return the bands 1 to their initial positions when the indicator is not in use or when it is required to set up a fresh announcement thereon. Each driving drum is furnished with a pair of stops 25 disposed at diametrically opposite points upon its circumference. A gravity or spring loaded pawl 26 is provided for each drum and coöperates with one of the stops at each half revolution of the drum so as to prevent return movement of the bands under the influence of the weights 21 aforesaid. Means are provided for simultaneously lifting all the pawls 26 clear of the stops 25 on their respective drums when it is desired to reroll the several bands. To this end the several pawls 26 are loosely mounted upon a suitably disposed common shaft 27 journaled to the walls 28 of the base plate, which walls also carry the main shaft 4 and the common spindle 5. In the case of the gravity pawls shown in the drawings the large bosses 29 serve as weights for maintaining the pawls normally in contact with their respective driving drums. Stops 30 project from these bosses 29 and arms 31 upon the common shaft 27 are adapted upon rotation of said shaft to come into contact with these stops 30 and through them to draw all the pawls out of engagement. An electromagnet 32 coöperates with an armature 33 fixed upon the shaft 27 to rotate said shaft and thereby withdraw the pawls.

In order to prevent overrunning when the bands return under the influence of the weights 21 I may in some cases provide in conjunction with each driving drum 2 and with the driving pulley 12 upon the drum 13 another pawl, such as 34, adapted, when the band is completely unwound from the said drum, to enter a corresponding recess in said drum or pulley and prevent further rotation thereof. This pawl 34 is pivoted at 35 and may be furnished with a spring 36 to insure its engaging the recess and is of such shape that when the drum is rotated in the reverse direction, for rewinding the band, the said pawl is automatically disengaged. It will be observed that when the band is so far wound upon the drum or pulley as to cover the recess aforesaid the pawl is prevented from engaging therein so that the said pawl is only operative when the band is completely unwound. Each drum may be provided with a suitable form of air brake adapted to limit its speed of rotation when the band is rerolling under the influence of the weight. These air brakes may take the form of vanes 37 rotatably mounted in links 38 pivoted at 39 to the base plate 9. The vanes are driven by means of small friction rollers 40 which by reason of springs 41 are caused to bear upon the peripheries of the driving drums.

A small electric motor is preferably employed for driving the main shaft of the indicator to which it is connected by the worm gearing 43. This motor is started up from the transmitter when it is desired to set up an announcement and is automatically stopped thereby as soon as the announcement is in position.

An insulating disk 44 mounted on the shaft 4 is provided with conducting pins 45 which are in electrical connection with each other and are adapted at every half revolution of the shaft to make contact with spring brushes 46 thereby completing an electric circuit to the transmitter.

This device practically operates to count the number of half revolutions at the main shaft during the setting up of an announcement and to transmit a corresponding number of electrical impulses to the transmitter whose function is to determine the period for which each drum is clutched up to the main shaft.

The means employed for preventing any attempt to set up a fresh announcement before the indicator bands have been returned to their normal position and the means whereby the motor is automatically stopped as soon as an announcement has been set up, will be more readily understood when the action of the transmitter has been described.

The transmitter which is illustrated in Figs. 3, 4 and 5 of the drawings comprises what I may most conveniently describe as a series of time switch mechanisms, each mechanism being connected to one of the driving drums on the indicator shaft. Thus the period for which each mechanism is set determines the number of half revolutions made by its corresponding drum before coming to rest.

According to my preferred construction each time switch mechanism comprises a spring member, such for instance, as a resilient copper strip 47, which normally tends to make contact with a fixed conducting bar 49 and so to establish an electric circuit through the corresponding clutch magnet on the indicator main shaft 4. The copper strips are fixed upon an insulating plate 48 and the conducting member 49 is common to all the several strips 47. When the transmitter is not in use, each strip is held out of contact with the fixed member by a slidable bar 50 the several slidable bars 50 being vertically disposed in the frame 51 of the transmitter. The upper ends of these bars pass through suitable slots in the top member of the frame 51, they are guided in recesses in the frame members 52 and their lower ends normally rest upon the strips 47.

Each of the bars 50 is adapted to be raised to a greater or less degree by means of a lever 53 engaging its lower end and when so raised each bar is held up by means of a pawl 54 engaging the rack teeth 55. The pawls 54 are independently pivoted upon a spindle 55' on the escapement member 57 which is itself pivoted at 58 to the frame 51. Leaf springs 59 upon the pawls 54 coöperate with a fixed bar 60 on the member 57 tending normally to keep the pawls in engagement with the rack teeth 55 and a stop bridge may be provided to prevent the pawls from being turned over. The escape member 57 is furnished with a bridge 61 which is adapted to act as a common pawl for the several sets of rack teeth 62. The spring 63 fixed to one of the frame members 52 and acting on the bar 60 tends to swing the member 57 over against the stop bar 64 in which position the bridge 61 is out of engagement with the teeth 62 and the pawls 54 engage the teeth 55. This arrangement permits the several racks to be raised to varying extents and through the agency of the escapement to be gradually returned to their normal position tooth by tooth each in a period dependent upon the extent to which it has been raised.

The escapement member 57 is actuated by an electromagnet 65 in circuit with the brushes 46 of the make and break device on the main shaft 4 of the indicator and the armature 66 of this electromagnet is mounted upon suitable arms integral with the member 57. In the foregoing description it has been made clear that at every half revolution of the main shaft of the indicator a fresh sign is moved into position by such of the drums as may be magnetically clutched to the said main shaft. It will also be clear that at every half revolution contact is made at the make and brake device and thereby the escapement on the transmitter is operated to allow each bar 50 to fall by the amount of one tooth. Since each clutching magnet is maintained energized until the corresponding bar has returned to its initial position and again rests upon the spring strip member 47 of its switch and breaks circuit it will be seen that the corresponding indicator driving drum continues to turn until the sign exhibited corresponds with the height to which the rack has been raised. As previously indicated the motor 42 continues to run until all the bars 50 have been severally returned to their initial positions, when, of course, the indicator will exhibit the required announcement or combination of signs. A switch 67 included in the motor circuit is adapted to be maintained closed by an electromagnet 68 which is in circuit with the fixed conducting bar 49. Thus so long as any of the spring members 47 touch the bar 49 the magnet 68 is energized and the motor circuit maintained closed, but as soon as the last bar descends and cuts off current from the bar 49 the magnet is deënergized and the motor circuit opened.

In order to provide for raising the several bars to different and variable extents I provide a series of slides 69 each of which is furnished at one end with a plurality of stops 70 preferably arranged in the form of steps. Each of these slides is arranged in the path of a pin 71 mounted on the corresponding lever 53 so that the stops 70 limit the motion of the levers.

Thus by moving each slide into a definite position the possible motion of the lever 53 associated with it and consequently the extent to which said lever can raise its corresponding bar 50 is correspondingly limited. It will be understood that each step on a slide corresponds to a definite numeral or other sign.

The actual movement of the several levers to operate the racks is effected simultaneously from a main operating lever 72. This lever is mounted on the rocking shaft 73 which is furnished with crank arms 74 between which is carried a rod 75. This rod 75 is connected by extensible spring couplings 76 to lugs or arms 77 on the levers 53 so that when the main lever 72 is operated the levers 53 can move to varying extents according as they are severally limited by the stops 70. All the levers 53 are pivoted upon a common spindle 78 carried between lugs 79 on the side plates of the frame 51. They are furnished with flat nose pieces 80 for raising the bars 50 and a common main spring 81 is provided for bringing all the levers to a position of rest against a common stop bar 82 when the transmitter is not being operated.

Each slide 69 is preferably provided with a device for bringing it to rest in one definite position for every step. Such device may consist of a spring mounted button 83 housed in a recess 84 in the slides and adapted automatically to engage suitably disposed holes in the base plate 85 or in a metal plate 86 inserted therein. Suitable type, indicated at 87 is attached to each slide 69 in such a position that the action of adjusting the slides to transmit an announcement automatically brings the type into position for printing a record of that announcement. Each slide is provided with an indicator scale 88 which coöperates with the wall 89 to show the operator what announcement he is setting up.

The strips upon which the record is printed are held between a pair of disks 90 which are adapted to be rotated so as to bring the strip into position for printing. These disks are mounted on a spindle 91 journaled in standards 92 and rotated by means of flexible steel bands 93 attached by adjustable spring connections 158 to posts 159 on a sliding link 94 actuated by the crank arm 74 upon the rocking shaft 73 and slotted to slide upon the spindle 91. The strips are inserted in suitable slots 95 in the disks 90 and held there by leaf springs 96. The disks 90 are normally held against rotation by a detent upon the extremity of an arm 97 pivoted at 98. A spring 99 constrains the detent normally to engage a corresponding notch in the periphery of one of the disks. An arm 100 on the spindle 91 coöperates with a stop 101 to limit the motion of the disks 90. An arm 102 integral with or attached to the arm 97 has a cam nose 103. When the lever 72 is operated, the end of the arm 74 comes into contact with the cam nose 103 and thereby withdraws the detent to release the disks. When the strip has been brought into position immediately above the type 87 printing is effected by means of a hammer 104 which descends upon the strip and brings it sharply into contact with the said type. This hammer is carried by arms 105 on a rocking shaft 106. It is coupled by a spring 107 to a link 108 of which one end is pivoted to the rod 75 and which has a slot 109 whereby it is guided upon a pin 110 on one of the arms 105. Between this pin 110 and a similar pin 111 on the link the spring 107 is mounted. A cam 112 is fixed upon the rocking shaft 106 and its nose 113 normally engages a stop 114 mounted on a leaf spring 115 attached to the base plate 85 or to a platform thereon so that at the commencement of movement of the lever 72 the motion of the hammer 104 is arrested until the strip is in position for printing. Consequently the spring coupling is stretched as the operating crank is moved. A projection 116 on the crank arm 74 then descends upon the stop and trips it free of the hammer, which is thus permitted to move under the influence of the stretched spring 107 and descends upon the strip with considerable impact.

The inking of the types is effected by means of an inking roller or series of rollers 117 which are caused to reciprocate over the surface of the several slides 69, the necessary motion being transmitted from the main operating cranks through a series of links. These latter comprise links 118 coupling the rod 75 to the upper ends of rocking levers 119 pivoted on spindle 78 and links 120 pivoted to the lower ends of these rocking levers and carrying at their upper ends a spindle 121 upon which are mounted the inking rollers 117. A bridge 122 between the links 120 carries leaf springs 123 which bears upon the rollers 117.

For the purposes of the printed record I may arrange to print the time or date at which the announcement is made or to record any other valuable information which however it may not be desired to exhibit upon the indicator. To effect this purpose I provide additional slides 124 having appropriate types 125 but no corresponding transmitter mechanism. These additional slides will of course be provided with indicating scales and with the spring button mechanism as in the case of the slides 69.

The motion of the main operating lever 72 is limited by a stop 126 and the lever also carries one member of a switch 127 which opens circuit through the indicator during the period in which bars 50 are being set. It is important that this switch be of such design as to break circuit before any one of the resilient strips 47 touches the contact bar 49. The main spring 81 tends normally to keep the switch closed and the lever 72 in the position shown in Fig. 5. With the lever 72 is also associated further switch gear the nature and function of which will hereinafter be described.

From the foregoing description it will be understood that it is essential that the indicator drums be returned to their initial positions before the transmitter operates to set up another announcement and this is most conveniently insured by providing an electro-mechanical interlock between the indicator and the main operating handle of the transmitter. Associated with the main operating lever 72 is a spring contact key 128 which normally rests in contact with a single contact post 129 mounted on a fixed insulating block 130. By means of a roller 131 on the lever 72 coöperating with a suitable cam 132 on the spring contact key 128, the latter can be forced over out of contact with the contact post 129 and into contact with other contact posts 133. After the roller 131 has passed the cam 132 the key returns to its normal position unless prevented from so doing by the electromagnet 134. The armature 135 on the key 128 enables the electromagnet, when energized, to hold the said key. As will be seen by reference to the electrical diagram Fig. 6 the switch 127 is connected to the positive lead 136 of the source of electrical supply and the contact post 129 to the main indicator circuits. Of the two contact posts 133 one is in connection with the negative lead 137 by way of a circuit which may best be described as an "interlocking circuit," while the other is in direct connection with the positive lead 136, the connection being in shunt with the switch 127 and therefore adapted to cut said switch out of the circuit.

In the interlocking circuit are included a plurality of contact making devices each associated with one indicator band or roller. All of the indicators are connected in parallel, but when their associated band or roller is in indicating position, each is adapted to make circuit with only one. The contact making devices preferably take the form of resilient metal leaves 138 attached to the pawls 34 and adapted when these pawls are raised to come into contact with a fixed contact strip 139. The interlocking circuit also includes the pawl lifting magnet 32 and the electromagnet 134 whereby the circuit when once closed is automatically maintained closed until interrupted at all the contact leaves 138.

As soon as the interlocking circuit is broken by the return of all the drums 2 and of the roller 6 to their initial position, the magnet 134 is, of course, deënergized and the contact key 128 returns to the contact post 129 to again complete the main circuit. It will be understood from the foregoing that this latter magnet only comes into operation if the lever 72 is depressed when the indicator parts are not in their zero or initial positions. Thus if it be desired merely to remove an announcement from the indicator, the slides 69 are pushed right home before the lever 72 is depressed and the interlocking circuit will then operate to zero the announcement bands. If, however, when the lever 72 is depressed there is already one announcement on the indicator and the slides 69 have previously been set to give a fresh announcement, the interlocking circuit automatically operates to clear the indicator before the fresh announcement is transmitted to it. By this means the interlocking circuit automatically protects the indicator against interference of signals without injuriously affecting its normal working.

The object of cutting out the switch 127 by means of the shunt connection 140 is to provide a path to the interlocking circuit from the positive lead 136 during the period when the said switch is opened by the operation of the lever 72. Without this connection it would be impossible for the circuit maintaining magnet 134 to be energized before the lever returned to close the switch, by which time the contact key 128 would have left the contact post of the interlocking circuit.

The electrical connections between the transmitter and the indicator are all shown in Fig. 6. From any suitable source of supply (not shown) current normally passes into the system by way of the positive lead 136 through a manually operable main switch 141 and returns by the negative lead 137. There are between these leads three working circuits and the interlocking circuit which insures the return of the indicator bands, as hereinbefore described. One circuit is through the indicator driving motor 42, while a second circuit is through the contacts of the revolution counting disk 44 and through the escapement magnet 65. Both these circuits are maintained as aforesaid only when the switch 67 is closed and the magnet 68 which keeps it closed is included in the third circuit, which may be traced from the positive lead 136 through the fixed contact bar 49 to each or any of the several resilient strips 47 and thence by way of the corresponding slip rings 18 to the driving magnets 14 and back to the negative lead 137. These three circuits are supplied through the switch 127 operated by the main lever 72 so that all are opened during the setting of the transmitter.

The means whereby the interlocking circuit is brought into action has already been described, but in Fig. 6 it may be traced out from the positive lead 136 through the shunt connection 140 to one contact 133, contact key 128, other contact 133, circuit maintaining magnet 134, pawl lifting magnet 32, contact strip 139 and contact leaves 138 to the return lead 137.

In order that two or more indicators may be worked simultaneously from one transmitter it is necessary to provide a synchronizing device to compensate for variations in the speed of the several indicator motors. This device works on the principle that each indicator, having made one half revolution must, if it has completed that half revolution in less time than its fellows, slow down until they have caught up. To effect this object the motors of all the indicators are connected in parallel, and a portion of the circuit, common to all the motors, is duplicated. This arrangement is illustrated diagrammatically in Fig. 7 which shows the connections to four indicators in parallel. The connections to the transmitter are similar to those shown in Fig. 6. Line 142 is in connection with the positive lead 136 and line 143 with the negative lead 137. The several motors 42 are shown in parallel connection and in series with each motor is a pair of synchronizing keys 144 and 145 which are adapted respectively to make connection with the two parallel lines 146 and 147. In line 147 is inserted a switch 149 and in line 146 a switch 148. Each switch tends normally to close under the influence either of gravity or of a spring, but may be held open by a magnet in the other line, so that the fact of current flowing in one line automatically opens circuit in the other. Each pair of synchronizing keys is mounted on its corresponding indicator and by means of a suitable cam 150 on the main shaft 4 circuit is simultaneously broken at one of these keys and made at the other at every half revolution, so that the return from the motors is alternately diverted from one of the lines 146, 147 to the other and back again periodically. The details of the synchronizing keys are illustrated in Fig. 8 in which the cam 150 is shown holding the contact key 145 in contact with the adjustable contact screw 151 while contact key 144 has just ridden over the nose 152 of the cam and thereby broken contact with adjustable contact screw 153. So long as all the indicators are running together on one return line (line 147 for instance) of course no synchronizing action takes place. Supposing, however, that one indicator overruns its fellows; its cam 150 puts its motor in circuit with the other line 146. But when this is done it can obtain no current for its motor since the circuit is maintained broken at the switch 148 by reason of the energized magnet 155 in the other line 147. In the case of a plurality of indicators it is maintained so broken until all the indicators have "changed circuit" to the line 146 when, of course, the magnet 155 is deënergized and the switch 148 closes. Simultaneously the magnet 154 is energized and opens switch 149. In this manner the overrunning motors will be held up at every half revolution until the slower ones have caught up. In Fig. 7 two indicators are shown in synchronism while the other two are represented as lagging behind to varying extents. Only one half-revolution counting disk is required for all the indicators and it may be located on any one of them. As shown in the diagram, Fig. 7, all the contact leaves 138 are connected in parallel between the negative line 143 and a positive line 156 which passes in series through the several contact strips 139 and the several pawl-lifting magnets 32 to the magnet 134 on the transmitter.

What I claim and desire to secure by Letters Patent is:

1. Apparatus for transmitting and displaying signals comprising a transmitter, an indicator comprising rotatable drums carrying an indicator band, an electric motor, a shaft driven by said motor, means controlled by the transmitter for starting the motor and means controlled by the transmitter for automatically clutching the driven shaft to the indicator driving drum, and means automatically operating to declutch said shaft from said drum and for stopping said motor as soon as the indicator band has reached the predetermined position to display the desired announcement.

2. Apparatus for transmitting and displaying signals comprising a transmitter, an indicator comprising rotatable drums carrying an indicator band, an electric motor, a shaft driven by said motor, means controlled by the transmitter for starting the motor, and electromagnetic means controlled by the transmitter for automatically clutching the driven shaft to the indicator driving drum, and means automatically operating to declutch said shaft from said drum and for stopping said motor as soon as the indicator band has reached the predetermined position to display the desired announcement.

3. Apparatus for transmitting and displaying signals comprising a transmitter common to and controlling a plurality of indicators, adapted to be set for transmitting a signal, a plurality of indicators controlled by said transmitter, a separate electric motor for operating each indicator, means for synchronizing the speed of rotation of said motors and means operated by the indicators for automatically returning the members of the transmitter to normal position.

4. Apparatus for transmitting and displaying signals comprising a transmitter and an indicator controlled by said transmitter, means for setting the transmitter to insure display by the indicator of a certain predetermined signal, means operated by the indicators for automatically returning the members of the transmitter to their normal positions, and means for preventing alteration of the signal display until the transmitter has been restored to normal position.

5. Apparatus for transmitting and displaying signals comprising a transmitter adapted to be set for insuring display of a signal, an indicator controlled by said transmitter for displaying said signal, printing mechanism adapted to be set and operated to record the signal displayed and means operated by the indicator for automatically returning the members of the transmitter to their normal positions.

6. Apparatus for transmitting and displaying signals comprising a transmitter, an indicator adapted to display combinations of figures and also simultaneously one or other of a series of explanatory words, means for setting the transmitter to select both the desired combination of figures and the selected word of the series for display, means operated by the indicator for automatically returning the members of the transmitter to their normal positions, and means for setting up and printing the displayed announcement on a record strip.

7. Apparatus for transmitting and displaying signals and the like comprising a transmitter, means for setting the transmitter to transmit a certain signal, means for preventing any part of the signal being transmitted until the setting operation is complete, a plurality of indicators controlled by the transmitter to display the signal, a separate electric motor operating each indicator, means controlled from the transmitter for starting the motors, means for synchronizing all the motors, and means for stopping the motors when the desired announcement has been displayed, and means operated by the indicators for automatically returning the members of the transmitter to their normal positions.

8. Apparatus for transmitting and displaying signals comprising a transmitter and an indicator, means for setting said transmitter to transmit a certain composite signal, means for preventing the transmission of any part of the signal to the indicator until the setting of the transmitter has been completed, an indicator, a main shaft operating said indicator, a plurality of display members operated by rotation of said shaft, an electric motor rotating said shaft, means controlled by the transmitter for starting said motor, means for stopping said motor as soon as the indicator has reached the position for displaying the desired announcement, means for causing each of the display members to be independently clutched to said shaft for varying periods dependent upon the setting of the transmitter, means for declutching the display member independently of each other after the varying periods, and means for stopping the rotation of the indicator shaft after all said display members have been declutched.

9. Apparatus for transmitting and displaying signals and the like comprising a transmitter, means for setting the transmitter to transmit a certain signal, means for preventing any part of the signal being transmitted until the setting operation is complete, an indicator operated by the transmitter to display the signal, means operated by the indicator for automatically returning the members of the transmitter to their normal positions, and means for preventing alteration of the signal display until the transmitter has been restored to normal position.

10. Apparatus for transmitting and displaying signals, said apparatus comprising a transmitter common to a plurality of indicators adapted to be set for transmitting a signal, a plurality of indicators controlled by said transmitter, when so set, to display the signal, a separate motor for operating each indicator and means for synchronizing all the motors, means operated by said indicators for automatically returning the members of the transmitter to their normal position, and means for preventing alteration of the signal display until the transmitter has been restored to normal position.

11. Apparatus for transmitting and displaying signals comprising a transmitter, adapted to be set for transmitting a signal, a plurality of dictators controlled by said transmitter, a main shaft driving each indicator, a separate electric motor driving each shaft, parallel electrical connection between all the motors, two synchronizing keys for each of said motors for alternately changing from one of the electrical connections to the other, an electrical interlock between such connections, and means associated with the motor synchronizing keys whereby overrunning motors are automatically connected to an interrupted line, means for maintaining the line interrupted until all the motors are connected thereto so that the overrunning motors will run light until such time, means for completing the circuit through said line when all the motors are connected thereto and for simultaneously interrupting the other lines.

In testimony whereof I affix my signature in presence of two witnesses.

ARCHIBALD ROBERTSON MITCHELL.

Witnesses:
A. A. THORNTON,
E. A. EVE.

Copies of this patent may be obtained for five cents each, by addressing the "Commissioner of Patents, Washington, D. C."